(12) United States Patent
Dutrey et al.

(10) Patent No.: US 12,546,834 B2
(45) Date of Patent: Feb. 10, 2026

(54) PROCESS FOR DETECTING AGEING OF A DC BUS CAPACITOR OF A POWER CONVERTER

(71) Applicant: Schneider Toshiba Inverter Europe SAS, Pacy sur Eure (FR)

(72) Inventors: Alain Dutrey, Fontaine-sous-Jouy (FR); Mohamad Koteich, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 80 days.

(21) Appl. No.: 18/534,897

(22) Filed: Dec. 11, 2023

(65) Prior Publication Data

US 2024/0201284 A1 Jun. 20, 2024

(30) Foreign Application Priority Data

Dec. 15, 2022 (EP) ...................................... 22306890

(51) Int. Cl.
 *G01R 31/12* (2020.01)
 *G01R 31/64* (2020.01)
(52) U.S. Cl.
 CPC .................................. *G01R 31/64* (2020.01)
(58) Field of Classification Search
 CPC .... G01R 27/2605; G01R 31/40; G01R 31/42; G01R 31/64; H02M 1/14; H02M 1/32; H02M 1/327; H02M 7/48; H02M 7/53873
 See application file for complete search history.

(56) References Cited

U.S. PATENT DOCUMENTS 10,218,203 B2 * 2/2019 Kano ...................... B60L 53/00
11,408,944 B2 * 8/2022 El Hayek ............... G01R 31/64
(Continued)

FOREIGN PATENT DOCUMENTS

EP 4057016 A1 9/2022

OTHER PUBLICATIONS

Torki, Jami et al., "Electrolytic capacitor: Properties and operation", Journal of Energy Storage, vol. 58, Dec. 14, 2022, 18 pages.
(Continued)

*Primary Examiner* — Thang X Le
(74) *Attorney, Agent, or Firm* — Wolf, Greenfield & Sacks, P.C.

(57) ABSTRACT

A method to estimate a remaining of useful life of a DC link capacitor of a converter through determination of a minimum value $C_{lim}$ of its capacitance C under which performances of the converter are considered as insufficient. The method includes implementing a real time model including a motor drive model and a capacitor model using decreasing capacitor values to calculate a forecasted minimum capacitance $C_{lim}$ sufficient for keeping at least one of DC voltage ripple, motor current ripple, speed ripple or torque ripple under a specified value. The method further includes calculating a time difference between a time $T_{actual}$, for which the capacitor has an estimated capacitance based on an ageing curve $C_{curve}$, and a time $T_{lim}$ for which the capacitor will have the forecasted minimum capacitance $C_{lim}$, with the use of an ageing curve $C_{curve}$ of the capacitor and estimating the remaining useful life of the capacitor $T_{actual}-T_{lim}$.

20 Claims, 3 Drawing Sheets

(56) References Cited

U.S. PATENT DOCUMENTS

| | | | | |
|---|---|---|---|---|
| 12,099,097 | B2* | 9/2024 | Bergogne | G01R 31/1227 |
| 2016/0356837 | A1* | 12/2016 | Nakao | G01R 31/64 |
| 2020/0235679 | A1* | 7/2020 | Jeong | H02P 23/10 |
| 2020/0363480 | A1* | 11/2020 | Schnell | G01R 31/016 |
| 2020/0371148 | A1* | 11/2020 | Scott | G01R 31/281 |
| 2022/0365143 | A1* | 11/2022 | Schroth | G01R 27/2605 |
| 2025/0096716 | A1* | 3/2025 | Liang | H02P 25/089 |

OTHER PUBLICATIONS

Hewitt, David A. et al., "Observation of electrolytic capacitor ageing behaviour for the purpose of prognostics", IECON 2016—42nd Annual Conference of the IEEE Industrial Electronics Society, Oct. 23, 2016, pp. 2195-2200.

Qaedi, Ramin et al., "Online capacitor early ageing monitoring and detection using a dynamic reference model", IET Science, Measurement and Technology, The Institution of Engineering and Technology, vol. 14, Issue 9, Nov. 1, 2020, pp. 731-738.

European Search Report and Search Opinion dated May 31, 2023 for corresponding European Patent Application No. EP22306890.9, 11 pages.

\* cited by examiner

PROCESS FOR DETECTING AGEING OF A DC BUS CAPACITOR OF A POWER CONVERTER

CROSS-REFERENCE TO RELATED APPLICATIONS

This application claims priority European Patent Application No. 22306890.9, filed on Dec. 15, 2022, which is hereby incorporated herein by the reference in its entirety.

FIELD OF THE DISCLOSURE

The present disclosure concerns maintenance of power converters and equipment such as motors and pumps powered by such power converters and provides an estimation of Remaining Useful Life (hereafter also named RUL) of a power converter having a DC Bus capacitor based on measuring the ageing of such capacitor during the life of said converter.

BACKGROUND

DC Bus capacitors are key functional components of DC link power converters, but they also are a major cause of failure due to their ageing sensitivity to operational voltage and temperature. Ageing capacitors have their capacitance decreasing with time and their equivalent serial resistance (hereafter ESR) increasing with time. Empirical models are used to estimate capacitor lifetime, using measured voltage and temperature as input. By taking operational context as an input and using generic models a prediction of potential end of life defined as critical failure of the capacitor may be furnished. However, this feed forward approach does not anticipate drifts caused by aged capacitors due to ageing models precision errors. In consequence, DC link applications where the DC link capacitor is aged may become unstable before an end of life event of the converter is predicted. In consequence, such ageing capacitors may create current and voltages ripples that degrade the operation of the devices powered by the power converters before the capacitors reach their full failure mode which is open or closed circuit.

SUMMARY OF THE INVENTION

In view of such context, the present disclosure concerns a method to estimate a remaining of useful life of a DC link capacitor of a converter through determination of a minimum value $C_{lim}$ of its capacitance C under which performances of the converter are considered as insufficient comprising:
implementing a real time model (130, 230) comprising a motor drive model and a capacitor model using decreasing capacitor values (140, 150, 240, 250) to calculate a forecasted minimum capacitance $C_{lim}$ sufficient for keeping at least one of DC voltage ripple, motor current ripple, speed ripple or torque ripple under a specified value;
calculating a time difference between a time $T_{actual}$, for which the capacitor has an estimated capacitance based on an ageing curve $C_{curve}$, and a time $T_{lim}$ for which the capacitor will have the forecasted minimum capacitance $C_{lim}$, with the use of an ageing curve $C_{curve}$ of said capacitor and estimating the remaining useful life of said capacitor $T_{actual}-T_{lim}$.

In embodiment which may be alternate or combined:
The method may comprise initializing said ageing curve through capacitance calculation of estimated values of said DC link capacitor during an initialization phase to provide an initial part of said ageing curve $C_{curve}$ and calculating a remainder of said ageing curve $C_{curve}$ using ageing characteristics of said capacitor.
Said capacitance calculation may comprise:
measuring of a voltage $v_{src}$ and a current $i_{src}$ at a voltage source upstream of the DC link capacitor;
measuring a voltage $v_{dc}$ downstream from said DC link capacitor and either measuring a current $i_{dc}$ or measuring an output power $P_{out}$ and calculating an input power $P_{dc}$, which is equal to an output power $P_{out}$ plus converter losses $P_{loss}$, downstream from said DC link capacitor;
calculating an estimation of a capacitance value $\hat{C}$ of said capacitor based on said voltage $v_{dc}$ downstream from said DC link capacitor, current $i_{dc}$ or input power $P_{dc}$;
Preferably, $P_{loss}$ is identified through a known function $P_{loss}=f(P_{out})$.

In a preferred embodiment, said motor drive model comprises performance criterion Pc, including, but not limited to, dc voltage oscillation amplitude and motor control quality and wherein said motor drive model is simulated for different system conditions, system parameters and system input power supply and load to evaluate such performance criterion continuously according to decreasing capacitance values and define said minimum acceptable capacitance $C_{lim}$.

Said different conditions may comprise grid impedance values $R_{dc}$, $L_{dc}$ which are pre-defined in the drive model or predefined by the user and based on the application load profile and history.

Said different conditions may also comprise grid impedance $R_{dc}$, $L_{dc}$, corresponding to a usual loading or grid impedance $R_{dc}$, $L_{dc}$ of a worst-case scenario, with maximum rated grid impedance and maximum loading.

The method may comprise further:
calculating an ESR of said DC link capacitor based on said measurements,
implementing a modified motor drive model and capacitor model considering said ESR of said DC link capacitor to calculate the minimum capacitance $C_{lim}$ and the minimum ESR $ESR_{lim}$ allowing controlled system stability, and,
determining an ESR curve $ESR_{curve}$ of said capacitor,
calculating (220) the time difference between the actual capacitance and the forecasted minimum capacitance $C_{lim}$ together with the difference between the actual ESR and the forecasted minimum ESR $ESR_{lim}$, to estimate the remaining useful life of said capacitor considering the first occurrence of one of said minimum capacitance and minimum ESR.

Said ageing curve $C_{curve}$ may be based on a capacitor ageing model of the form $$C_a(t) = e^{\alpha t} + \beta$$

The method may also comprise further tracking a capacitance value $C_{actual}$ through a capacitance observer activated during transient conditions of the operation of the converter.

The method may also comprise calculating temperature of said capacitor using a comparison of said capacitance value $C_{actual}$ and a capacitor $C_{ageing}$ resulting of the capacitor curve $C_{curve}$ obtained after the curve initialization.

BRIEF DESCRIPTION OF THE DRAWINGS

A detailed description of exemplary embodiments will be discussed hereunder in reference to the attached drawings where.

DETAILED DESCRIPTION OF EMBODIMENTS OF THE INVENTION

Figure 1:
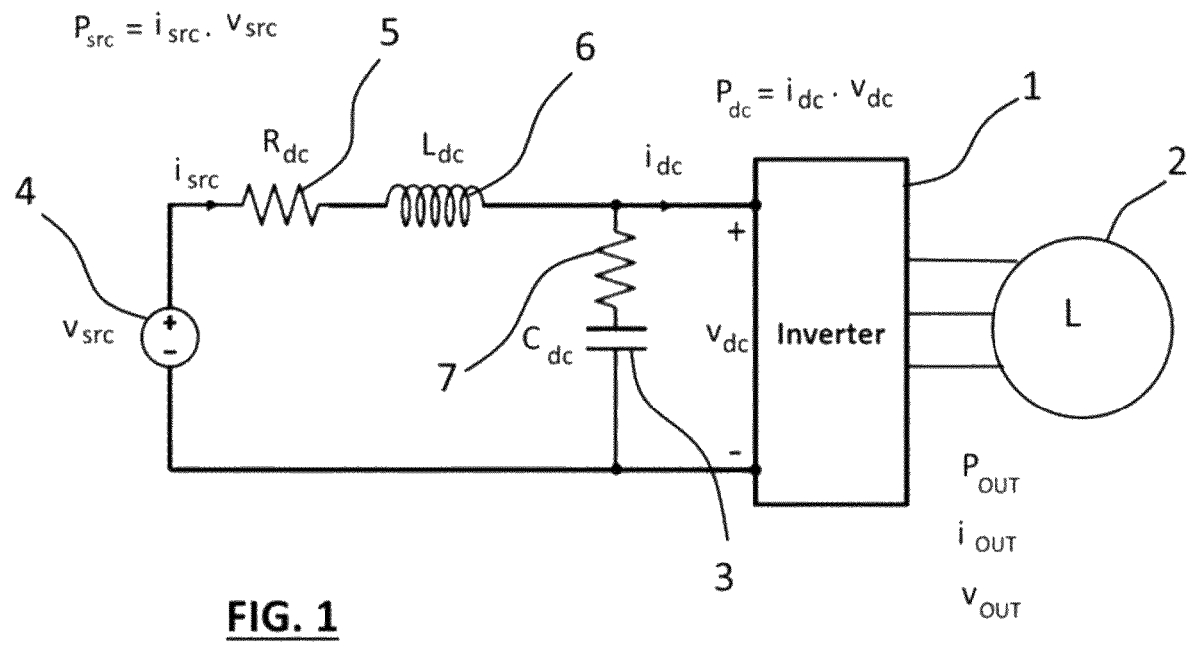
FIG. 1 shows a basic inverter circuit comprising a DC bus capacitor.
Figure 6:
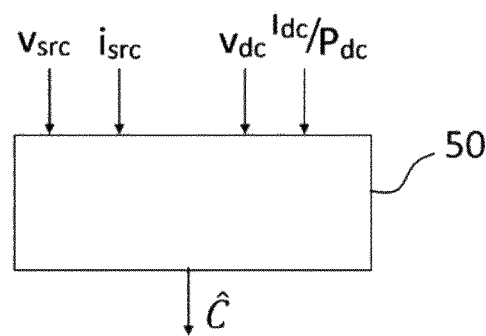
FIG. 6 shows a flowchart of a method of the disclosure.

To estimate a remaining useful life (RUL) of a capacitor of a converter, such as a converter 1 driving a load 2 such as a motor, comprising a DC Link capacitor 3 having an ESR 7 as depicted in FIG. 1, the present disclosure provides measurements of the values of the capacitance C of the DC Link capacitor 3 and uses an embedded motor drive model implemented in a control module of the motor.

In order to evaluate the health of such a DC link capacitor, performance criteria may include DC voltage oscillation, DC voltage amplitude and motor control quality. In the present disclosure one or more of such criteria are implemented in the motor drive model. The model is implemented in real time in different conditions of a power supply 4 of the converter 1 in term of grid resistance $R_{dc}$ 5 and grid self $L_{dc}$ 6, and the selected performance criterion is evaluated continuously considering at least one of the following grid conditions which are the most relevant for the application:

Case 1: A realistic grid resistance $R_{dc}$ 5 and grid self $L_{dc}$ 6, with usual loading (e.g. based on the application load profile and history).

Case 2: A worst-case scenario, with maximum grid resistance $R_{dc}$ 5 and grid self $L_{dc}$ 6, (weak grid) and maximum load of the motor.

The grid conditions may be pre-defined in a control program of the converter, a control program of a remote survey system or defined in a case by case basis by the user.

The implementation of the model is performed in all cases for different values of capacitance of the capacitor 3 in order to simulate the behavior of the capacitor during its ageing e.g., by using the forecasted values in the ageing curves of the capacitor. When at least one of the performance criteria is violated in simulation, the corresponding value of the capacitance is recorded as a minimum value $C_{lim}$. This being done, the ageing curve is used to calculate the time difference between the actual capacitance point and the forecasted $C_{lim}$ point, to estimate the RUL of such capacitor. When the model is implemented with case 1 data, the calculated RUL is considered as an estimated RUL. When the model is implemented with case 2 data, the calculated RUL is considered as a first RUL limit to provide a warning. One or both limits can be used to assess the RUL within the corresponding context (conservative worst-case or more realistic based on the application).

The load drive model can be a detailed model, or an equivalent simplified model. The granularity of the model will impact the precision of the RUL estimation.

In particular, introducing the equivalent serial resistance ESR of the capacitor allows to obtain a more accurate simulation and RUL calculation.

The present disclosure also provides a method to find the minimum value of capacitance of the DC link capacitor that guarantees good performance of the converter as $C_{lim}$ may serve to provide a limit working capacitor value for such capacitor.

The present disclosure uses estimation of the capacitance and its parasitic resistance from input and/or output voltages and currents measurement and DC Bus voltage. In addition, a collection of empirical ageing functions allows to extrapolate the fitted estimated capacitance and estimate remaining useful life without knowledge of the temperature.

Since the capacitance vary locally according to the temperature, the temperature can be estimated by adding a local variation model to the calculated ageing model. Then capacitor stress, seen as the present ageing tendency is computed as a derivative of ageing fitting.

This, together with computing the minimum capacitance allowing controlled system stability, allows to predict the beginning of failure of the DC link power system due to capacitance reduction over time.

Figure 2:
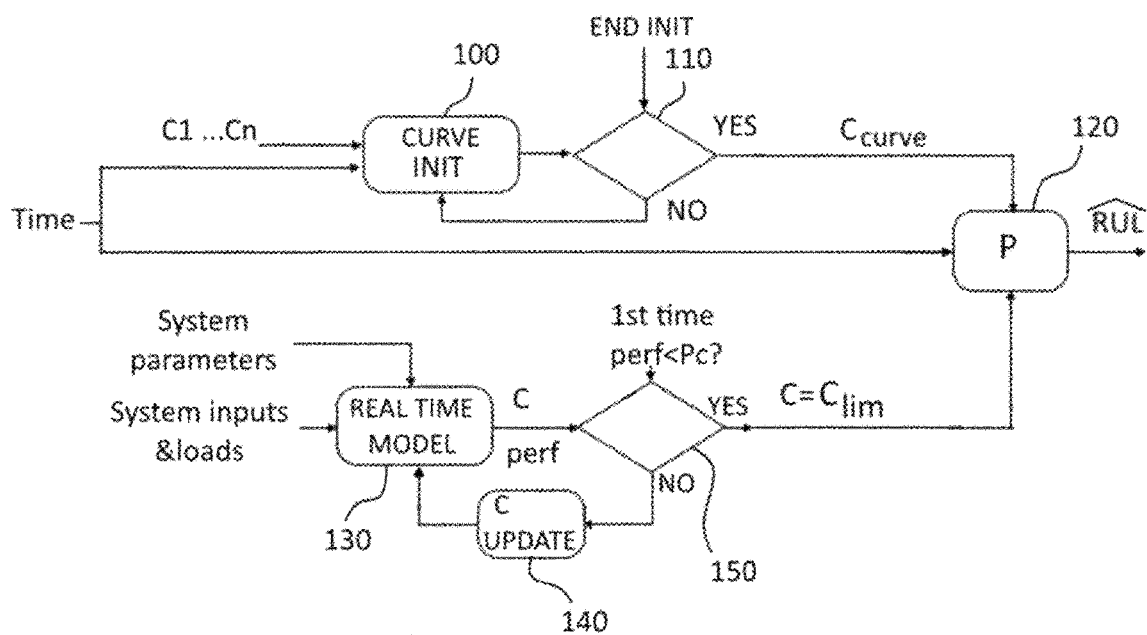
FIG. 2 shows a first embodiment of capacitor ageing determination process.

In FIG. 2 the upper part concerns the calculation of the capacitor curve $C_{curve}$. In this example measured capacitor values and time t are input in a curve initialization module 100 and the curve is initialized providing a resulting curve $C_{curve}$ until an end of initialization 110 is reached.

The lower part of FIG. 2 concerns the computation of the lower capacitor value $C_{lim}$ using the real time model 130 of the motor which is computed with different values of system parameters and system input and load in accordance with case 1 or case 2 above and for decreasing values of capacitance 140 for capacitor 3. The model outputs a performance which is compared to a performance criterion 150. Calculation with the model is reiterated with updated decreasing capacitor values 140. The first time the performance of the simulated motor drive model is under the selected criterion perf<Pc, the capacitance model 160 is implemented to obtain the limit lower value $C_{lim}$ of C under which the capacitor is considered as too degraded to allow a correct operation of the converter.

Both the $C_{curve}$ and the limit value $C_{lim}$ are computed in a prognosis estimator 120 taking into account the current time to calculate the RUL of the capacitor.

Figure 3:
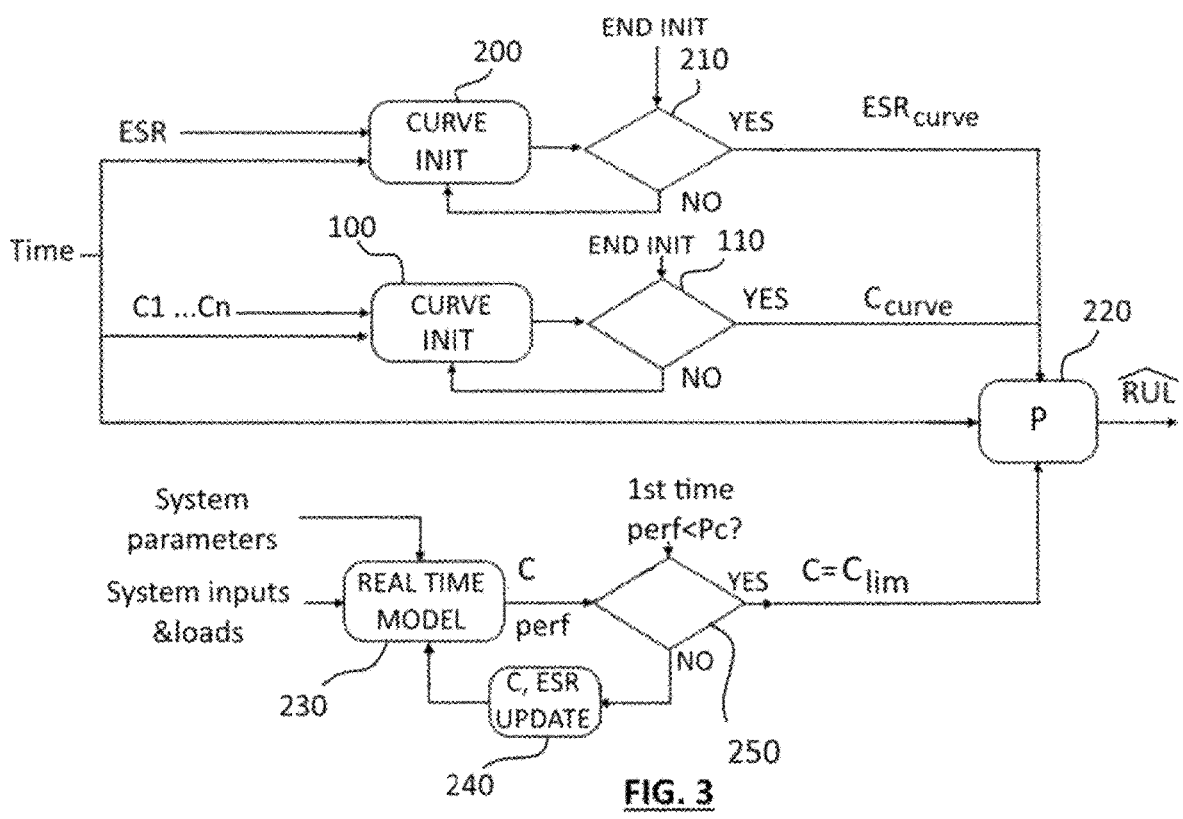
FIG. 3 shows a second embodiment of capacitor ageing determination process with ESR evaluation.

In FIG. 3, the method takes into account the ESR of the capacitor 3 at the initialization phase where an ESR curve initialization 200 is done until an end 210 of the ESR curve initialization process is reached. The ESR curve $ESR_{curve}$ is provided together with the capacitance curve $C_{curve}$ to the prognosis estimator 220 receiving also the $C_{lim}$ value calculated with an adapted real time model 230 taking into account C and ESR values. As in FIG. 2, the model is implemented with decreasing C values and increasing ESR values until the performances of the converter goes under specified performance criteria such as ripple, dc voltage oscillation amplitude and motor control quality which determines the $C_{lim}$ value.

Figure 4:
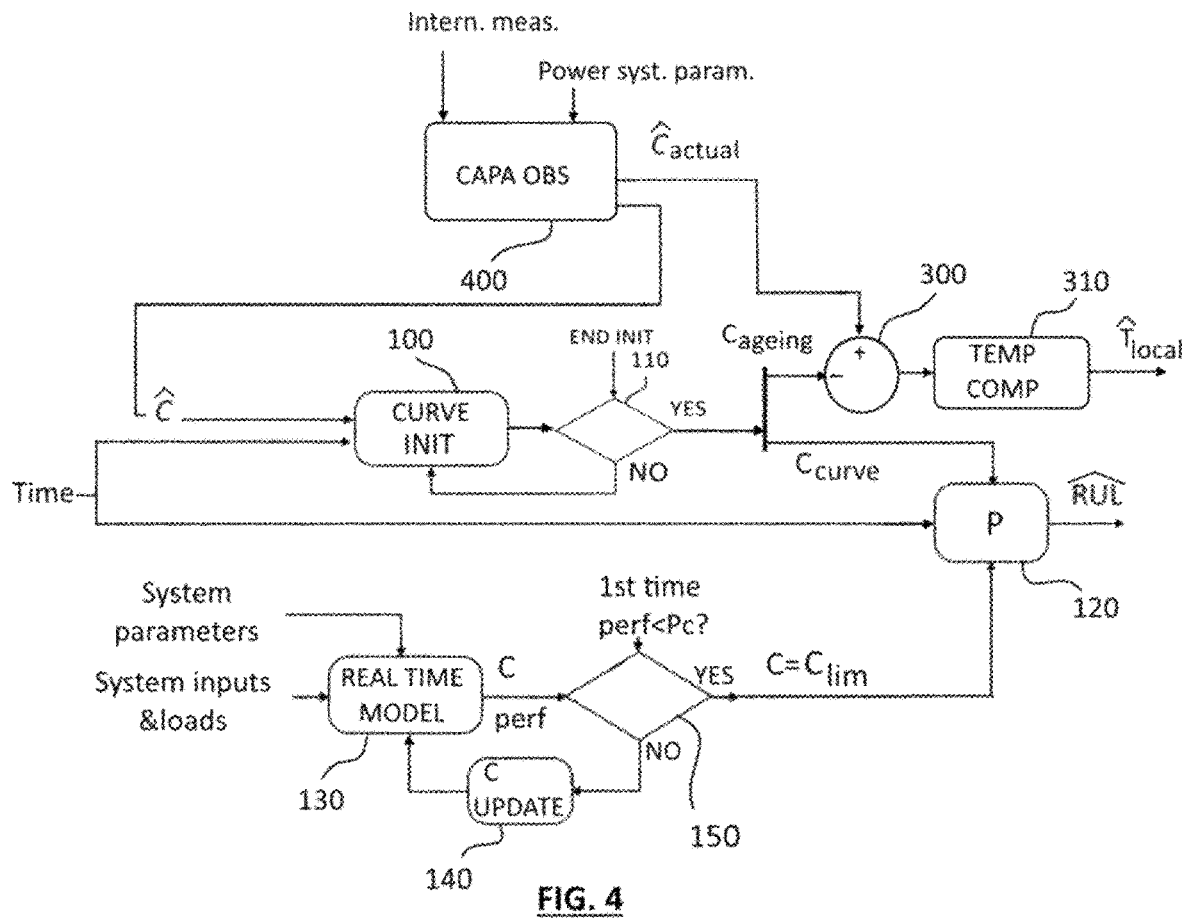
FIG. 4 shows a third embodiment of capacitor ageing determination process with temperature computation and additional capacitance observer means.

FIG. 4 concerns a realization mode based on the realization mode of FIG. 2 where a temperature measurement is added through comparing 300 an estimated capacitor value $C_{actual}$ estimated through an observer module 400 together with the ageing capacitor value $C_{ageing}$ calculated with the curve initialization module 100 in order to provide a delta signal to a temperature computation module 310.

The capacitor observer module 400 has as inputs the power system parameters and internal measurements of the converter device of FIG. 1 in order to calculate the estimated capacitor value $C_{actual}$.

Figure 5:
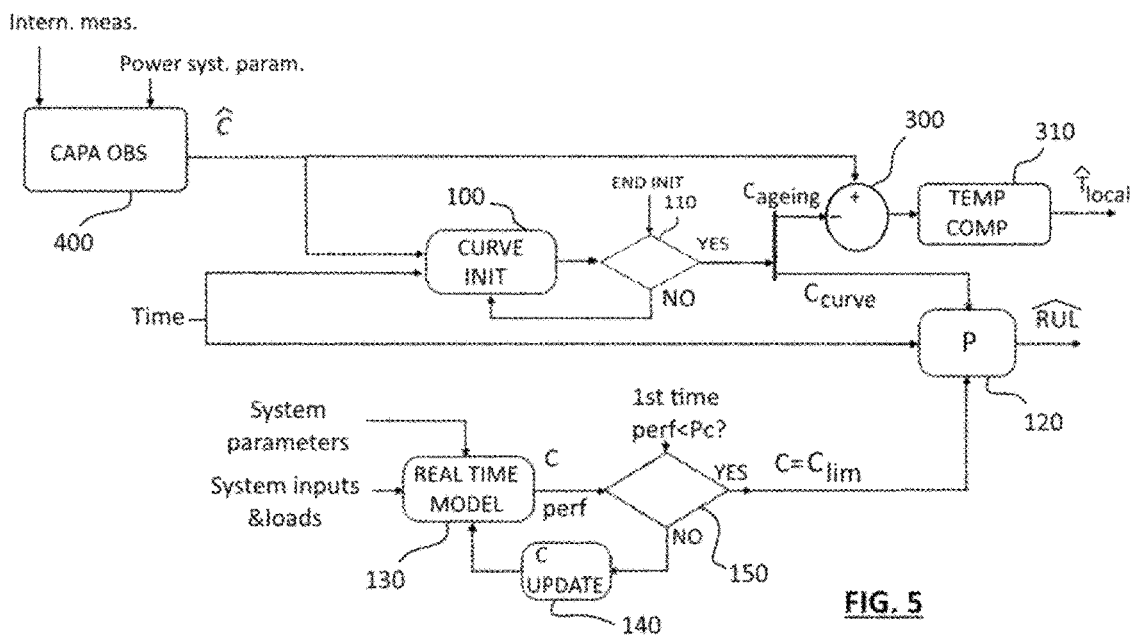
FIG. 5 shows a fourth embodiment of capacitor ageing determination process with temperature computation and capacitance observer means.

In FIG. 5 the observer means 400 are used also for the capacitance curve initialization 100. This also permits to proceed to modifications of the curve during the life of the converter through renewed initialization processes.

The realizations modes of FIGS. 4 and 5 may also be based on the realization mode of FIG. 3 where the ESR is used to improve the $\overline{RUL}$ estimation.

In all the realization modes, the estimated remaining useful life $\overline{RUL}$ of the capacitor.

To summarize, the method to estimate a remaining of useful life of a DC link capacitor 3 of a converter 1 through determination of a minimum value of its capacitance $C_{lim}$ under which performances of the converter are considered as insufficient comprises:

a. implementing a motor drive model 130, 230 using decreasing capacitor values 140, 150, 240, 250 and a capacitor model 160, 260 to calculate a forecasted minimum capacitance $C_{lim}$ keeping at least one of DC voltage ripple, motor current ripple, speed ripple or torque ripple under a specified value;

b. calculating a time difference between a time $T_{actual}$, for which the capacitor has an actual capacitance determined by an ageing curve $C_{curve}$, and a time $T_{lim}$ for which the capacitor will have the forecasted minimum capacitance $C_{lim}$, with the use of the ageing curve $C_{curve}$ of said capacitor and estimating the remaining useful life of said capacitor $T_{actual} - T_{lim}$ 120.

This method may be repeated periodically or at specific instances of the life of the converter to provide adapted RUL data according to the use of the converter.

The ageing curve may be obtained through measurements on said DC link capacitor during an initialization phase to provide an initial part of said ageing curve $C_{curve}$.

This may be done through measurement of a voltage $v_{src}$ and a current $i_{src}$ at a voltage source upstream of a DC link capacitor, measuring a voltage $v_{dc}$ downstream from said DC link capacitor and either measuring a current $i_{dc}$ or measuring an output power $P_{out}$ and calculating an input power $P_{dc}$, which is equal to the output power $P_{out}$ plus converter losses $P_{loss}$, downstream from said DC link capacitor. Such measurements are input in a controller 50 having analog to digital converters and means to calculate an estimation of an actual capacitance $\hat{C}$ of said capacitor and calculating a remainder of said ageing curve $C_{curve}$ using ageing characteristics of said capacitor which may be input according to manufacturer data.

In case, the output power $P_{out}$ is measured, the input power $P_{dc}$ is calculated using a known function $P_{loss} = f(P_{out})$.

In order to initialize and calculate the capacitor ageing curve, the following traditional model (a) may be considered:

$$C_a(t) = e^{\alpha t} + \beta \quad (a)$$

In such case, such model can be expressed as a state model as follow:

$$\frac{dC_a(t)}{dt} = \alpha C_a(t) - \alpha \beta$$

Differentiation expression allows to write such model under a recursive form:

$$\frac{C_a(t) - C_a(t - \Delta t)}{\Delta t} = \alpha C_a(t - \Delta t) - \alpha \beta$$

$$C_a(t) = (1 + \alpha \Delta t) C_a(t - \Delta t) - \alpha \beta \Delta t$$

This provides the recursive expression:

$$C_a(n) = (1 + \alpha \Delta t) C_a(n - 1) - \alpha \beta \Delta t$$

$$C_a(n) = C_a(n - 1) + \alpha \Delta t C_a(n - 1) - \alpha \beta \Delta t$$

which allows to model the capacitor ageing recursively with a non-constant sampling.

For calculation, a recursive LMS (least mean square) algorithm may then be considered where parameters of the model (a) above are identified through calculation under matrix form:

$$r(t) = \begin{bmatrix} r_1 \\ r_2 \\ r_3 \end{bmatrix} = \begin{bmatrix} C_{n-1} \\ \Delta t C_{n-1} \\ -\Delta t \end{bmatrix}$$

$$\hat{p}(t+1) = \begin{bmatrix} \hat{p}_1 \\ \hat{p}_2 \\ \hat{p}_3 \end{bmatrix} = \begin{bmatrix} 1 \\ \alpha \\ \alpha \beta \end{bmatrix}$$

$$k(t+1) = \frac{P(t)r(t)}{1 + r^T(t)P(t)r(t)}$$

$$P(t+1) = P(t) - k(t+1)r^T(t)P(t)$$

$$\hat{y}_m(t+1) = r^T(t)\hat{p}(t)$$

$$\hat{p}(t+1) = \hat{p}(t) + k(t+1)[y_s(t+1) - \hat{y}_m(t+1)]$$

Where $r^T$ is the transposed vector of vector r
With initialization of:

$$P(t_0) = \begin{bmatrix} P_0 & 0 & 0 \\ 0 & P_0 & 0 \\ 0 & 0 & P_0 \end{bmatrix} \text{ with } P_0 \gg 1$$

$$\hat{p}(t_0) = \begin{bmatrix} 1 \\ \alpha_0 \\ \alpha_0 \beta_0 \end{bmatrix}$$

with $\alpha_0$ and $\beta_0$ identified from manufacturer ageing information, or accelerated ageing tests done on the capacitor 3. Such LMS algorithm allows to build an approximated C curve.

A recursive LMS with forgetting factor algorithm may also be used to build the curve and adapt such to working conditions of the converter:

In such algorithm is introduced a scalar forgetting factor λ to allow adaptation to a new ageing model due to changes in the operating conditions.

Calculations under matrix form allows to identify parameters of the model (a):

$$r(t) = \begin{bmatrix} r_1 \\ r_2 \\ r_3 \end{bmatrix} = \begin{bmatrix} C_{n-1} \\ \Delta t C_{n-1} \\ -\Delta t \end{bmatrix}$$

$$\hat{p}(t+1) = \begin{bmatrix} \hat{p}_1 \\ \hat{p}_2 \\ \hat{p}_3 \end{bmatrix} = \begin{bmatrix} 1 \\ \alpha \\ \alpha\beta \end{bmatrix}$$

$$k(t+1) = \frac{P(t)r(t)}{\lambda + r^T(t)P(t)r(t)}$$

$$P(t+1) = \lambda^{-1}P(t) - k(t+1)r^T(t)\lambda^{-1}P(t)$$

$$\hat{y}_m(t+1) = r^T(t)\hat{p}(t)$$

$$\hat{p}(t+1) = \hat{p}(t) + k(t+1)[y_s(t+1) - \hat{y}_m(t+1)]$$

With initialization of:

$$P(t_0) = \begin{bmatrix} P_0 & 0 & 0 \\ 0 & P_0 & 0 \\ 0 & 0 & P_0 \end{bmatrix} \text{ with } P_0 \gg 1$$

$$\hat{p}(t_0) = \begin{bmatrix} 1 \\ \alpha_0 \\ \alpha_0 \beta_0 \end{bmatrix}$$

with $\alpha_0$ and $\beta_0$ identified from manufacturer ageing information, or accelerated ageing tests done on this capacitor.

These algorithms may be implemented in a controller of the converter or a controller of the motor but may also be implemented in a remote control system of the motor or controller.

Concerning the motor drive model, such model may comprise performance criterion Pc, including, but not limited to, dc voltage oscillation amplitude and motor control quality.

The drive model is used to simulate the behavior of the converter for decreasing values of the capacitance of the capacitor 3. The motor drive model 130, 230 simulates different system conditions, system parameters, system input power supply and load to evaluate at least one performance criterion continuously according to decreasing capacitance values. When such a performance criterion goes under a limit which corresponds to a degraded working mode of the converter, the corresponding capacitance value defines said minimum acceptable capacitance $C_{lim}$.

As seen above, different system conditions comprise grid impedance values Rdc 5, Ldc 6 which are pre-defined in the drive model or set by the user and based on the application load profile and history or comprise grid impedance Rdc 5, Ldc 6, of a worst-case scenario, with maximum rated grid impedance and maximum loading.

The method may be improved through the use of the ESR 7 of the capacitor in the calculations.

The method may then comprise:
a. calculating a DC link capacitor ESR based on the measurements of the voltage vsrc and current isrc at a voltage source upstream of the DC link capacitor and the measurements of the voltage vdc and current idc downstream from said DC link capacitor measurements,
b. implementing a modified motor drive model 230 and capacitor model 260 considering said DC link capacitor ESR to calculate the minimum capacitance $C_{lim}$ and the minimum ESR, $ESR_{lim}$ allowing controlled system stability,
c. determining an ESR curve $ESR_{curve}$ of said capacitor, and
d. calculating 220 the time difference between the actual capacitance and the forecasted minimum capacitance $C_{lim}$ together with the difference between the actual ESR and the forecasted minimum ESR $ESR_{lim}$, to estimate the remaining useful life of said capacitor considering the first occurrence of one of said minimum capacitance and minimum ESR.

The method may comprise tracking the capacitance value through a capacitance observer 400 activated during transient conditions.

The following dc-link model can be used to design an observer that tracks the capacitance value:

$$\frac{di_{src}}{dt} = -\frac{R_{dc}}{L_{dc}}i_{src} + \frac{1}{L_{dc}}v_{src} - \frac{1}{L_{dc}}v_{dc}$$

$$\frac{dv_{dc}}{dt} = \frac{1}{C_{dc}}i_{src} - \frac{P}{C_{dc}v_{dc}}$$

$$\frac{dC_{dc}}{dt} = 0$$

The system is nonlinear, we can study the observability of the linearized system around equilibrium.

The observability condition is $P_0 \neq v_{dc0}i_{src0}$. Note that in at equilibrium:

$$i_{src0} = \frac{v_{src0} - v_{dc0}}{R_{dc}}$$

and $P_{src0} = v_{src0}i_{src0} = R_{dc}i_{src0}^2 + v_{dc0}i_{src0}$.

Then, the observability condition can be expressed as:

$$P_0 \neq P_{src0} - R_{dc}i_{src0}^2$$

The above inequality is not valid for DC-steady state. It is nevertheless valid during transient, and for sinusoidal (harmonic) steady state. Therefore, the above system is only observable during transient or sinusoidal (harmonic) steady state. With respect to the harmonic steady state, observations are possible using the ripple of the voltage $V_{DC}$ in FIG. 1 but such observations need sampling means which are fast enough to sample said ripple.

Another approach considers the ESR, denoted $r_c$. The system becomes:

$$\frac{di_{src}}{dt} = -\frac{R_{dc} + r_c}{L_{dc}}i_{src} + \frac{r_c}{L_{dc}}i_{dc} + \frac{v_{src} - v_c}{L_{dc}}$$

$$\frac{dv_c}{dt} = \frac{i_{src} - i_{dc}}{C_{dc}}$$

-continued $$\frac{dC_{dc}}{dt} = 0$$

$$\frac{dr_c}{dt} = 0$$

$$v_{dc} = v_c + r_c(i_{src} - i_{dc})$$

Knowing that $$i_{dc} = \frac{P_{dc}}{v_{dc}} = \frac{P}{v_c + r_c(i_{src} - i_{dc})}$$

In this equation $P_{dc} = i_{dc} \cdot v_{dc}$. $P_{dc}$ is not measured but can be estimated directly knowing the losses ratio of the converter, and the output power $P_{out}$ of the converter. With the known curve LossRatio($P_{out}$)=$P_{out}/P_{dc}$, then $P_{dc} = i_{out} \cdot v_{out} \cdot$ LossRatio ($P_{out}$). $V_{dc}$ being known, we can also use LossRatio ($i_{out}$, $v_{out}$)=$i_{out}/i_{dc}$ on the output current to estimate $P_{dc} = i_{out} \cdot v_{dc} \cdot$ LossRatio($i_{out}$).

When solving $i_{dc}$ and replacing in the above equations, the system becomes highly nonlinear, and the linearization is tedious. To simplify, let's start with $i_{dc}$ as an independent source. The system is still nonlinear, when linearized it becomes:

$$\frac{d}{dt}\begin{bmatrix} i_{src} \\ v_c \\ C_{dc} \\ r_c \end{bmatrix} = \begin{bmatrix} -\frac{R_{dc}+r_{c0}}{L_{dc}} & -\frac{1}{L_{dc}} & 0 & \frac{i_{dc0}-i_{src0}}{L_{dc}} \\ \frac{1}{C_{dc0}} & 0 & \frac{i_{dc0}-i_{src0}}{C_{dc0}^2} & 0 \\ 0 & 0 & 0 & 0 \\ 0 & 0 & 0 & 0 \end{bmatrix} \begin{bmatrix} i_{src} \\ v_c \\ C_{dc} \\ r_c \end{bmatrix} +$$

$$\begin{bmatrix} \frac{1}{L_{dc}} & \frac{r_{c0}}{L_{dc}} \\ 0 & -\frac{1}{C_{dc0}} \\ 0 & 0 \\ 0 & 0 \end{bmatrix} \begin{bmatrix} v_{src} \\ i_{dc} \end{bmatrix}$$

$$y = v_{dc} = [r_{c0} \quad 1 \quad 0 \quad i_{src0} - i_{dc0}] \begin{bmatrix} i_{src} \\ v_c \\ C_{dc} \\ r_c \end{bmatrix} + [0 \quad -r_c] \begin{bmatrix} v_{src} \\ i_{dc} \end{bmatrix}$$

The observability condition is $i_{src0} \neq i_{dc0}$, which is not the case in steady state. Therefore, the system in only observable in transient operation or sinusoidal (harmonic) steady-state.

To observe the value of $r_c$, such value needs to be added to the state vector.

$i_{dc} = P/v_{dc}$ is not directly measured, but is known from the measurement of $v_{dc}$ and the indirect measurement of the power P using internal control signals, ex: $P = v_a i_a + v_b i_b + v_c i_c + P_{loss}^{inv}$ where a, b, c are the three phases of the motor.

$P = i_{dc} \cdot v_{dc}$, P is not measured, but can be estimated directly knowing the losses ratio of the converter, and the output power $P_{DC}$ at the source side. With the known curve LossRatio($P_{dc}$)=$P_{dc}/P$, then $P = i_{src} \cdot v_{src} \cdot$ LossRatio ($P_{dc}$).

In this specific application, the grid input voltage is measured, and the dc-link parameters (dc-choke) are known, $v_c$ is the capacitor voltage. $r_c$ is the ESR.

Observability study shows that the system is also observable during transients which allows to estimate the capacitance of the capacitor 3.

This permits to calculate the temperature of said capacitor using a comparison of a measured capacitance and a capacitor $C_{ageing}$ resulting of the capacitor curve $C_{curve}$ obtained after the curve initialization 100.

In building the ageing curve for the capacitor, the values of C outside the curve are rejected. However, in use, the values outside the curve are used to give a temperature value using the supplier curve $\Delta C/\Delta$temp.

The invention is not limited to the above description and in particular the embodiment of FIG. 5 may be modified to incorporate the ESR calculation of FIG. 3.

The invention claimed is:

1. A method to estimate a remaining of useful life of a DC link capacitor of a converter through determination of a minimum value $C_{lim}$ of capacitance C under which performances of the converter are considered as insufficient, the method comprising:
    calculating a forecasted minimum capacitance $C_{lim}$ sufficient for keeping at least one of DC voltage ripple, motor current ripple, speed ripple or torque ripple under a specified value, wherein calculating the forecasted minimum capacitance $C_{lim}$ comprises:
        simulating, using a drive model, a behavior of the converter for decreasing values of the capacitance C under different system conditions to obtain a performance output of the converter; and
        comparing the performance output to at least one performance criterion Pc associated with the converter; and
    calculating a time difference between a time $T_{actual}$, for which the capacitor has an estimated capacitance based on an ageing curve $C_{curve}$, and a time $T_{lim}$ for which the capacitor will have the forecasted minimum capacitance $C_{lim}$ using said ageing curve $C_{curve}$ and estimating the remaining useful life of said capacitor using the time $T_{actual}$ and the time $T_{lim}$.

2. The method according to claim 1, further comprising initializing said ageing curve through capacitance calculation of estimated values of said DC link capacitor during an initialization phase to provide an initial part of said ageing curve $C_{curve}$ and calculating a remainder of said ageing curve $C_{curve}$ using ageing characteristics of said capacitor.

3. The method according to claim 2, wherein said capacitance calculation comprises:
    measuring of a voltage $v_{src}$ and a current $i_{src}$ at a voltage source upstream of the DC link capacitor;
    measuring a voltage $v_{dc}$ downstream from said DC link capacitor and either measuring a current $i_{dc}$ or measuring an output power $P_{out}$ and calculating an input power $P_{dc}$, which is equal to an output power $P_{out}$ plus converter losses $P_{loss}$, downstream from said DC link capacitor; and
    calculating an estimation of a capacitance value $\hat{C}$ of said capacitor based on said voltage $v_{dc}$ downstream from said DC link capacitor, current $i_{dc}$ or input power $P_{dc}$.

4. The method according to claim 3, wherein $P_{loss}$ is identified through a known function $P_{loss} = f(P_{out})$.

5. The method according to claim 1, wherein said performance criterion Pc a dc voltage oscillation amplitude or a motor control quality.

6. The method according to claim 5, wherein said different system conditions comprise grid impedance values $R_{dc}$, $L_{dc}$ which are pre-defined in the drive model or predefined by user and based on application load profile and history.

7. The method according to claim 6, wherein said different system conditions comprise grid impedance $R_{dc}$, $L_{dc}$ corresponding to a usual loading or grid impedance $R_{dc}$, $L_{dc}$ of a worst-case scenario, with maximum rated grid impedance and maximum loading.

8. The method according to claim 1, further comprising:
calculating an equivalent system resistance ESR of said DC link capacitor based on said simulation,
implementing a modified drive model using said ESR of said DC link capacitor to calculate the minimum capacitance $C_{lim}$ and a minimum ESR $ESR_{lim}$ allowing controlled system stability,
determining an ESR curve $ESR_{curve}$ of said capacitor, and
calculating the time difference between an actual capacitance and the forecasted minimum capacitance $C_{lim}$ together with the difference between the actual ESR and the forecasted minimum ESR $ESR_{lim}$, to estimate the remaining useful life of said capacitor considering a first occurrence of one of said minimum capacitance and minimum ESR.

9. The method according to claim 1, wherein said ageing curve $C_{curve}$ is based on a capacitor ageing model of a form $C_\alpha(t)=e^{\alpha t}+\beta$.

10. The method according to claim 2, further comprising tracking a capacitance value $C_{actual}$ through a capacitance observer activated during transient conditions of an operation of the converter.

11. The method according to claim 10, further comprising calculating temperature of said capacitor using a comparison of said capacitance value $C_{actual}$ and a capacitor $C_{ageing}$ resulting of the capacitor curve $C_{curve}$ obtained after the curve initialization.

12. The method according to claim 1, further comprising tracking a capacitance value $C_{actual}$ through a capacitance observer activated during transient conditions of an operation of the converter.

13. A system to estimate a remaining of useful life of a DC link capacitor of a converter through determination of a minimum value $C_{lim}$ of capacitance C under which performances of the converter are considered as insufficient, the system comprising a control module configured to:
calculate a forecasted minimum capacitance $C_{lim}$ sufficient for keeping at least one of DC voltage ripple, motor current ripple, speed ripple or torque ripple under a specified value, wherein calculating the forecasted minimum capacitance $C_{lim}$ comprises:
simulating, using a drive model, a behavior of the converter for decreasing values of the capacitance C under different system conditions to obtain a performance output of the converter; and
comparing the performance output to at least one performance criterion Pc associated with the converter; and
calculate a time difference between a time $T_{actual}$, for which the capacitor has an estimated capacitance based on an ageing curve $C_{curve}$, and a time $T_{lim}$ for which the capacitor will have the forecasted minimum capacitance $C_{lim}$ using said ageing curve $C_{curve}$ and estimating the remaining useful life of said capacitor using the time $T_{actual}$ and the time $T_{lim}$.

14. The system according to claim 13, wherein the control module is further configured to initialize said ageing curve through capacitance calculation of estimated values of said DC link capacitor during an initialization phase to provide an initial part of said ageing curve $C_{curve}$ and calculate a remainder of said ageing curve $C_{curve}$ using ageing characteristics of said capacitor.

15. The system according to claim 14, wherein said capacitance calculation comprises:
measuring of a voltage $v_{src}$ and a current $i_{src}$ at a voltage source upstream of the DC link capacitor;
measuring a voltage $v_{dc}$ downstream from said DC link capacitor and either measuring a current $i_{dc}$ or measuring an output power $P_{out}$ and calculating an input power $P_{dc}$, which is equal to an output power $P_{out}$ plus converter losses $P_{loss}$, downstream from said DC link capacitor; and
calculating an estimation of a capacitance value $\hat{C}$ of said capacitor based on said voltage $v_{dc}$ downstream from said DC link capacitor, current $i_{dc}$ or input power $P_{dc}$.

16. The system according to claim 15, wherein $P_{loss}$ is identified through a known function $P_{loss}=f(P_{out})$.

17. The system according to claim 13, wherein said performance criterion Pc a dc voltage oscillation amplitude or a motor control quality.

18. The system according to claim 17, wherein said different system conditions comprise grid impedance values $R_{dc}$, $L_{dc}$ which are pre-defined in the drive model or pre-defined by user and based on application load profile and history.

19. The system according to claim 18, wherein said different system conditions comprise grid impedance $R_{dc}$, $L_{dc}$ corresponding to a usual loading or grid impedance $R_{dc}$, $L_{dc}$ of a worst-case scenario, with maximum rated grid impedance and maximum loading.

20. The system according to claim 13, wherein the control module is further configured to:
calculate an equivalent system resistance ESR of said DC link capacitor based on said simulation,
implement a modified drive model using said ESR of said DC link capacitor to calculate the minimum capacitance $C_{lim}$ and a minimum ESR $ESR_{lim}$ allowing controlled system stability,
determine an ESR curve $ESR_{curve}$ of said capacitor, and
calculate the time difference between an actual capacitance and the forecasted minimum capacitance $C_{lim}$ together with the difference between the actual ESR and the forecasted minimum ESR $ESR_{lim}$, to estimate the remaining useful life of said capacitor considering a first occurrence of one of said minimum capacitance and minimum ESR.

* * * * *